(12) United States Patent
Schober et al.

(10) Patent No.: US 11,985,681 B2
(45) Date of Patent: May 14, 2024

(54) TRIGGERED HYBRID AUTOMATIC REPEAT REQUEST ACKNOWLEDGEMENT REPORTING FOR DOWNLINK SEMI-PERSISTENT SCHEDULING DATA TRANSMISSION

(71) Applicant: Nokia Technologies Oy, Espoo (FI)

(72) Inventors: Karol Schober, Helsinki (FI); Renato Barbosa Abreu, Aalborg (DK); Kari Hooli, Oulu (FI); Timo Lunttila, Espoo (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 125 days.

(21) Appl. No.: 17/361,863

(22) Filed: Jun. 29, 2021

(65) Prior Publication Data

US 2022/0030558 A1 Jan. 27, 2022

Related U.S. Application Data

(60) Provisional application No. 63/054,756, filed on Jul. 21, 2020.

(51) Int. Cl.
*H04W 72/04* (2023.01)
*H04L 1/18* (2023.01)
(Continued)

(52) U.S. Cl.
CPC ........... *H04W 72/23* (2023.01); *H04L 1/1812* (2013.01)

(58) Field of Classification Search
CPC .... H04W 72/23; H04L 1/1812; H04L 1/1854; H04L 1/1607
See application file for complete search history.

(56) References Cited

U.S. PATENT DOCUMENTS

2018/0279274 A1  9/2018  Sun et al.
2019/0261354 A1  8/2019  Fakoorian et al.
(Continued)

FOREIGN PATENT DOCUMENTS

JP   2023-510912 A   3/2023
WO   2021146702 A1   7/2021

OTHER PUBLICATIONS

Extended European Search Report received for corresponding European Patent Application No. 21179166.0, dated Nov. 23, 2021, 7 pages.
(Continued)

*Primary Examiner* — Hoang-Chuong Q Vu
(74) *Attorney, Agent, or Firm* — SQUIRE PATTON BOGGS (US) LLP

(57) ABSTRACT

A method may include receiving, by a user equipment from a network entity, a first downlink (DL) control signal activating semi-persistent scheduling (SPS) of a first set of downlink data transmissions, the downlink control signal indicating an applicable hybrid automatic repeat request (HARQ) feedback timing for the first set of downlink data transmissions and receiving one or more of the first set of downlink data transmissions. The user equipment may determine that an applicable HARQ feedback timing for a second set of downlink data transmission previously received with an inapplicable HARQ feedback timing has not been provided. In response to the determination, the user equipment may determine a HARQ feedback timing for the one or more of the first set of downlink data transmissions based a second DL control signal indicating an applicable HARQ feedback timing received after reception of the one or more of the first set of downlink data transmissions.

15 Claims, 12 Drawing Sheets

(51) Int. Cl.
*H04L 1/1812* (2023.01)
*H04W 72/23* (2023.01)

(56) References Cited

U.S. PATENT DOCUMENTS

| | | | | |
|---|---|---|---|---|
| 2020/0077470 | A1* | 3/2020 | Xiong | H04W 24/08 |
| 2020/0106569 | A1 | 4/2020 | Tsai et al. | |
| 2020/0322097 | A1* | 10/2020 | Hsieh | H04L 1/1854 |
| 2020/0389878 | A1* | 12/2020 | Karaki | H04W 72/23 |
| 2021/0067276 | A1* | 3/2021 | Wang | H04L 1/1861 |
| 2021/0105102 | A1* | 4/2021 | Li | H04L 1/1896 |
| 2021/0320760 | A1* | 10/2021 | Rastegardoost | H04L 1/0028 |
| 2021/0345382 | A1* | 11/2021 | Khoshnevisan | H04L 1/1854 |
| 2022/0007399 | A1* | 1/2022 | Rastegardoost | H04L 1/1854 |
| 2022/0110150 | A1* | 4/2022 | Lin | H04W 72/23 |
| 2022/0116970 | A1* | 4/2022 | Gao | H04L 5/0053 |
| 2022/0123906 | A1* | 4/2022 | Wu | H04L 1/1812 |
| 2022/0263608 | A1* | 8/2022 | Wei | H04L 1/1887 |
| 2022/0369350 | A1* | 11/2022 | Yoshimura | H04W 72/23 |
| 2023/0011110 | A1* | 1/2023 | Shi | H04W 72/1273 |
| 2023/0023656 | A1* | 1/2023 | Rastegardoost | H04W 72/0446 |
| 2023/0043308 | A1* | 2/2023 | Li | H04L 5/0055 |
| 2023/0055619 | A1* | 2/2023 | Li | H04W 72/1273 |
| 2023/0058397 | A1* | 2/2023 | Harada | H04L 1/1854 |
| 2023/0066773 | A1* | 3/2023 | Lei | H04L 1/1864 |
| 2023/0076328 | A1* | 3/2023 | Harada | H04L 1/1812 |
| 2023/0091988 | A1* | 3/2023 | Li | H04L 1/1861 |
| 2023/0291504 | A1* | 9/2023 | Cheng | H04L 1/1812 |
| | | | | 370/329 |

OTHER PUBLICATIONS

"Feature lead summary#1 on email discussion 100b-e-NR-unlic-NRU-HARQ-03 (SPS)", 3GPP TSG RAN WG1 Meeting #100bis, R1-2002924, Agenda: 7.2.2.2.3, Huawei, Apr. 20-30, 2020, 10 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Physical layer procedures for data (Release 16)", 3GPP TS 38.214, V16.1.0, Mar. 2020, pp. 1-151.

"TP for Enhancements to Scheduling and HARQ operation for NR-U", 3GPP TSG RAN WG1 Meeting #101-e, R1-2004445, Agenda: 7.2.2.2.3, Qualcomm Incorporated, May 25-Jun. 5, 2020, 6 pages.

"Maintenance for Procedure for Two-step RACH", 3GPP TSG RAN WG1 #100bis, R1-2002432, Agenda: 7.2.1.2, NTT DOCOMO, Inc, Apr. 20-30, 2020, pp. 1-2.

"3rd Generation Partnership Project; Technical Specification Group Radio Access Network; NR; Physical layer procedures for control (Release 16)", 3GPP TS 38.213, V16.2.0, Jun. 2020, pp. 1-176.

"3rd Generation Partnership Project; Technical Specification Group Radio Access Network; NR; Multiplexing and channel coding (Release 16)", 3GPP TS 38.212, V16.2.0, Jun. 2020, pp. 1-151.

International Search Report and Written Opinion received for corresponding Patent Cooperation Treaty Application No. PCT/FI2021/050439, dated Oct. 12, 2021, 16 pages.

"Discussion on DRX for NR-U", 3GPP TSG-RAN WG2 Meeting 107bis, R2-1913031, Agenda: 6.2.2.4, Huawei, Oct. 14-18, 2019, 6 pages.

Indian Examination Report corresponding to Indian Application No. 202317007862, dated Oct. 31, 2023.

Japanese Office Action corresponding JP Application No. 2023-504598, dated Apr. 1. 2024.

* cited by examiner

TRIGGERED HYBRID AUTOMATIC REPEAT REQUEST ACKNOWLEDGEMENT REPORTING FOR DOWNLINK SEMI-PERSISTENT SCHEDULING DATA TRANSMISSION

RELATED APPLICATION

The present application claims priority from U.S. Provisional Application No. 63/054,756, filed 21 Jul. 2020.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for reporting hybrid automatic repeat request (HARQ) acknowledgments for downlink data transmissions.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

According to some aspects, there is provided a subject matter of the independent claims. Some further aspects are defined in the dependent claims. Embodiments that do not fall under the scope of the claims are to be interpreted as examples useful for understanding the disclosure.

In a first aspect of the present disclosure, a method is provided. The method comprises: receiving, by a user equipment from a network entity, a first downlink (DL) control signal activating semi-persistent scheduling (SPS) of a first set of downlink data transmissions, the downlink control signal indicating an applicable hybrid automatic repeat request (HARQ) feedback timing for the first set of downlink data transmissions; receiving one or more of the first set of downlink data transmissions; determining that an applicable HARQ feedback timing for a second set of downlink data transmission received with an inapplicable HARQ feedback timing has not been provided, the second set of downlink data transmissions being received prior to the one or more of the first set of downlink data transmissions; and in response to the determination, determining a HARQ feedback timing for the one or more of the first set of downlink data transmissions based on a second downlink control signal indicating an applicable HARQ feedback timing received after reception of the one or more of the first set of downlink data transmissions.

In a second aspect of the present disclosure, an apparatus is provided. The apparatus comprises at least one processor and at least one memory including computer program code. The at least one memory and the computer program code are configured to, with the at least one processor, cause the apparatus at least to perform the method according to the first aspect.

In a third aspect, a non-transitory computer-readable medium is provided. The computer-readable medium comprises program instructions stored thereon for causing an apparatus to perform a process according to the first aspect.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reporting hybrid automatic repeat request (HARQ)-acknowledgment (ACK) HARQ feedback for downlink (DL) semi-persistent scheduling (SPS) transmissions after being triggered by separate downlink control signal, for example DL control information (DCI), is not intended to limit the scope of certain embodiments, but is instead representative of selected example embodiments.

Figure 1:
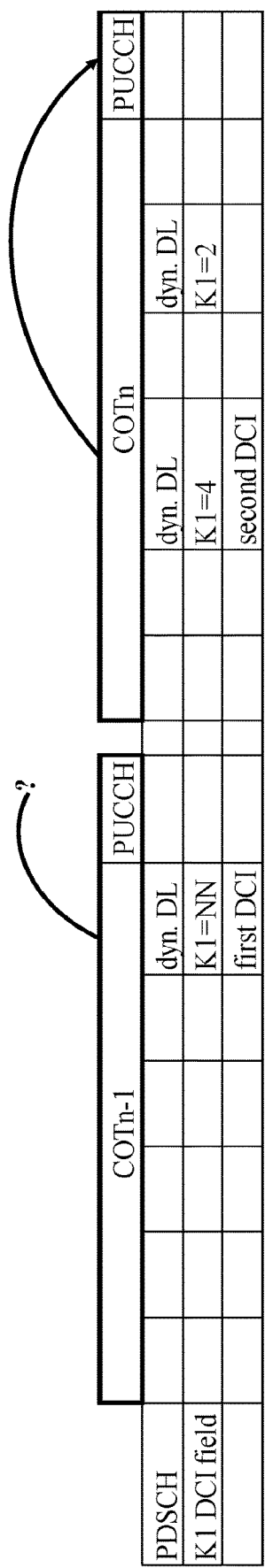
FIG. 1 illustrates an example of a postponed HARQ feedback based on an inapplicable timing indication.

Some communication systems, such as Third Generation Partnership Project (3GPP) New Radio Unlicensed (NR-U) Release (Rel)-16 systems, may be expected to provide support for postponed HARQ feedback for DL data transmissions, e.g., physical downlink shared channel (PDSCH) transmissions. For example, a base station, such as a Next Generation Node B (gNB) or an eNB, may indicate a non-numerical (NN)-K1 value in a first downlink control information (DCI) scheduling a first physical downlink shared channel (PDSCH). In contrast to a numerical K1 value which directly indicates the timing between the PDSCH and HARQ feedback (which may include positive acknowledgements (ACK) or negative acknowledgement (NACK)) transmission (e.g., in physical uplink control channel (PUCCH)), a NN-K1 value may just indicate that the actual feedback timing will be subsequently indicated. The base station may transmit a second DCI with regular numerical K1 value to facilitate a determination of HARQ feedback timing for the first dynamic scheduled PDSCH, as illustrated in FIG. 1.

An NN-K1 value may be referred to as an "inapplicable" timing indication, while a regular numerical K1 value may be referred to as an "applicable" timing indication. These values may enable postponed HARQ feedback transmissions for at least one DL data transmission, e.g., a PDSCH scheduled in the end of a channel occupancy time (COT), where the processing time by a user equipment (UE) would be insufficient to report HARQ feedback (e.g., ACK or NACK) in PUCCH within the same COT as the corresponding PDSCH. In addition, since the base station would need to perform another listen before talk (LBT) operation to acquire another COT, the timing of the next HARQ feedback transmission is unknown and could not be indicated in a downlink (DL) assignment. However, an NN-K1 value could be used anywhere in a COT, based on the configuration of the base station, such as when a corresponding K1 value is not configured, allowing the NN-K1 value to be used at any slot before the slot of PUCCH, as a K1 value that may be used in any slot. It should be appreciated that some embodiments of the present disclosure are not limited to any specific way of using NN-K1 and K1 to indicate an inapplicable timing and applicable timing. Other indications (e.g., an applicable indication) are also possible.

DL SPS is a grant-less operation. Rather than scheduling each PDSCH transmission dynamically with a dedicated PDCCH DCI message, the base station could configure, for example, the periodicity of downlink assignments, the number of HARQ processes, and PUCCH resources for HARQ feedback, to the UE, for example, in a SPS configuration information element (IE) SPS-Config, such as provided as follows:

```
-  SPS-Config
The IE SPS-Config is used to configure downlink semi-persistent transmission.
Downlink SPS may be configured on the SpCell as well as on SCells. The network
ensures SPS-Config is configured for at most one cell in a cell group.
                         SPS-Config information element
-- ASN1START
-- TAG-SPS-CONFIG-START
SPS-Config ::=         SEQUENCE [
   periodicity         ENUMERATED [ms10, ms20, ms32, ms40, ms64, ms80, ms128, ms160, ms320,
ms640,
                         spare6, spare5, spare4, spare3, spare2, spare1},
   nrofHARQ-Processes     INTEGER (1..8),
   n1PUCCH-AN            PUCCH-ResourceId
OPTIONAL,      -- Need M
   mcs-Table           ENUMERATED {qam64LowSE}
OPTIONAL,      -- Need S
   ...
}
-- TAG-SPS-CONFIG-STOP
-- ASN1STOP
```

The DL SPS may be activated with an activation DCI, which can provide various parameters, such as physical resource block (PRB) resources and modulation and coding scheme (MCS), of the periodic transmission. Some DL SPS parameters may be provided by a radio resource control (RRC) configuration. In addition, some unused DCI fields set to 0 may be used for validation of the DCI for activation/deactivation. As an example, a UE may validate, for scheduling activation or scheduling release, a DL SPS assignment PDCCH or configured UL grant Type 2 PDCCH if the CRC of a corresponding DCI format is scrambled with a configured scheduling radio network temporary identifier (CS-RNTI) provided by cs-RNTI, and the new data indicator field for the enabled transport block is set to "0." Validation of the DCI format may be achieved if all fields for the DCI format are set according to Table 1 or Table 2, provided below. If validation is achieved, the UE may consider the information in the DCI format as a valid activation or valid release of DL SPS or configured UL grant Type 2. If validation is not achieved, the UE may discard all the information in the DCI format.

TABLE 1

Special fields for DL SPS and UL grant Type 2 scheduling activation PDCCH validation

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 2

Special fields for DL SPS and UL grant Type 2 scheduling
release PDCCH validation

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

A UE may be expected to provide HARQ feedback information in response to a SPS PDSCH release after N symbols from the last symbol of a PDCCH providing the SPS PDSCH release. For UE processing capability 1 and for the subcarrier spacing (SCS) of the PDCCH reception, N=10 for 15 kHz, N=12 for 30 kHz, N=22 for 60 kHz, and N=25 for 120 kHz. For a UE with capability 2 in frequency range (FR)1 and for the SCS of the PDCCH reception, N=5 for 15 kHz, N=55 for 30 kHz, and N=11 for 60 kHz.

Thus, when DL SPS is activated, the UE may provide HARQ feedback, K1 slots after each PDSCH transmission, in a PUCCH resource when HARQ feedback for DL SPS is transmitted, where the K1 value is indicated by a field in the activation DCI.

The PUCCH resource in a slot or sub-slot used for SPS HARQ feedback may be provided by a RRC parameter, such as n1PUCCH-AN in 3GPP Rel-15. In 3GPP Rel-16, where a UE can have more than one active SPS PDSCH configuration, a parameter (e.g., SPS-PUCCH-AN-List) can provide the UE with a set of PUCCH resources, which would then determine the PUCCH resource to be used based on the payload size of uplink control information (UCI). Alternatively, if HARQ feedback for SPS PDSCH is multiplexed with HARQ feedback for dynamic PDSCH, such as where both feedbacks are transmitted in the same slot, the PUCCH resource would be determined based on the DCI scheduling dynamic PDSCH.

It is noted that PUCCH resources for DL SPS PDSCH may be preconfigured, and the K1 value can be indicated in DL SPS activation DCI. When the UE fails to decode SPS PDSCH correctly, the UE may report a negative-acknowledgement (NACK) to the base station. In response, the base station may dynamically schedule retransmission for the SPS PDSCH. Thus, the UE may also receive dynamically scheduled PDSCHs when the UE has SPS PDSCH configuration activated. In 3GPP NR, out-of-order (OOO) HARQ is not supported; thus, the UE is not expected to receive a first PDSCH in slot i, with the corresponding HARQ feedback assigned to be transmitted in slot j, and a second PDSCH starting later than the first PDSCH with its corresponding HARQ feedback assigned to be transmitted in a slot before slot j.

Figure 2:
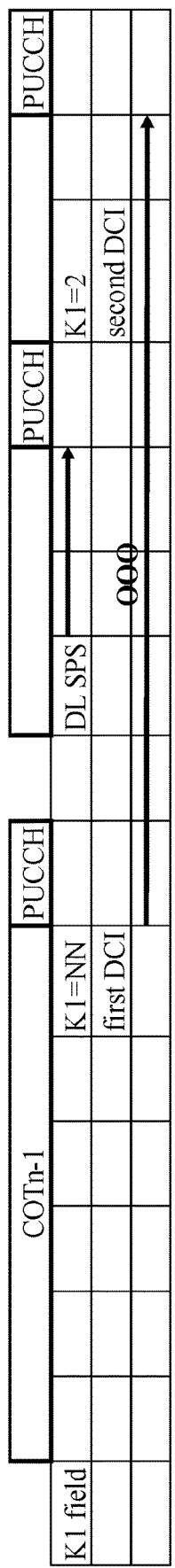
FIG. 2 illustrates an example of an out of order hybrid automatic repeat request with a non-numerical K1.

As noted above, when operating on unlicensed spectrum, the use of an inapplicable timing indication (e.g., NN-K1) enables triggering subsequent PDSCH HARQ feedback when the base station has acquired another COT. Using dynamically scheduled transmissions with NN-K1 when DL SPS is configured may result in some disadvantages. For example, a UE may receive dynamically scheduled PDSCH with NN-K1 if the UE does not receive the second DCI before a periodic instance of DL SPS transmission since the second DCI is unscheduled and/or missed by the UE. As shown in FIG. 2, this may result in OOO HARQ processes, which is an error case/situation from the UE point of view, as mentioned above. FIG. 2 illustrates an example where a base station could avoid scheduling a first DCI to avoid OOO HARQ, resulting in a scheduling restriction. However, there may be cases where the second DCI is transmitted before the DL SPS, but the UE misses the second DCI. In such cases, the base station is unable to prevent OOO transmissions by scheduling. Furthermore, similar disadvantages may occur in case of an enhanced type-2 codebook (CB) with triggered HARQ feedback retransmission, regardless of the presence of NN-K1. In addition, with DL SPS, PUCCH resources may be determined from RRC configurations, with the slot of the PUCCH resources being determined from the activation DCI. Such semi-static timing determinations may be unsuitable in unlicensed spectrum when frame structuring is floating due to LBT procedure, and not following simple periodic structures.

Certain embodiments described herein may enable a base station to avoid OOO HARQs and/or enable postponed HARQs for a DL SPS configuration, e.g., based on a setting of a timing indication (e.g., K1 value in the activation DL SPS DCI). Alternatively or in addition, certain embodiments may enable the collection of HARQ feedback from multiple DL SPS configurations using the same HARQ feedback process ID in the past, thereby improving efficiency. As an example, a UE may clear a soft buffer of old transport blocks for a HARQ process; when the HARQ process is run again, the UE may instead store an associated HARQ feedback until reported. Thus, certain embodiments discussed below are directed to improvements in communication related technology.

Figure 3:
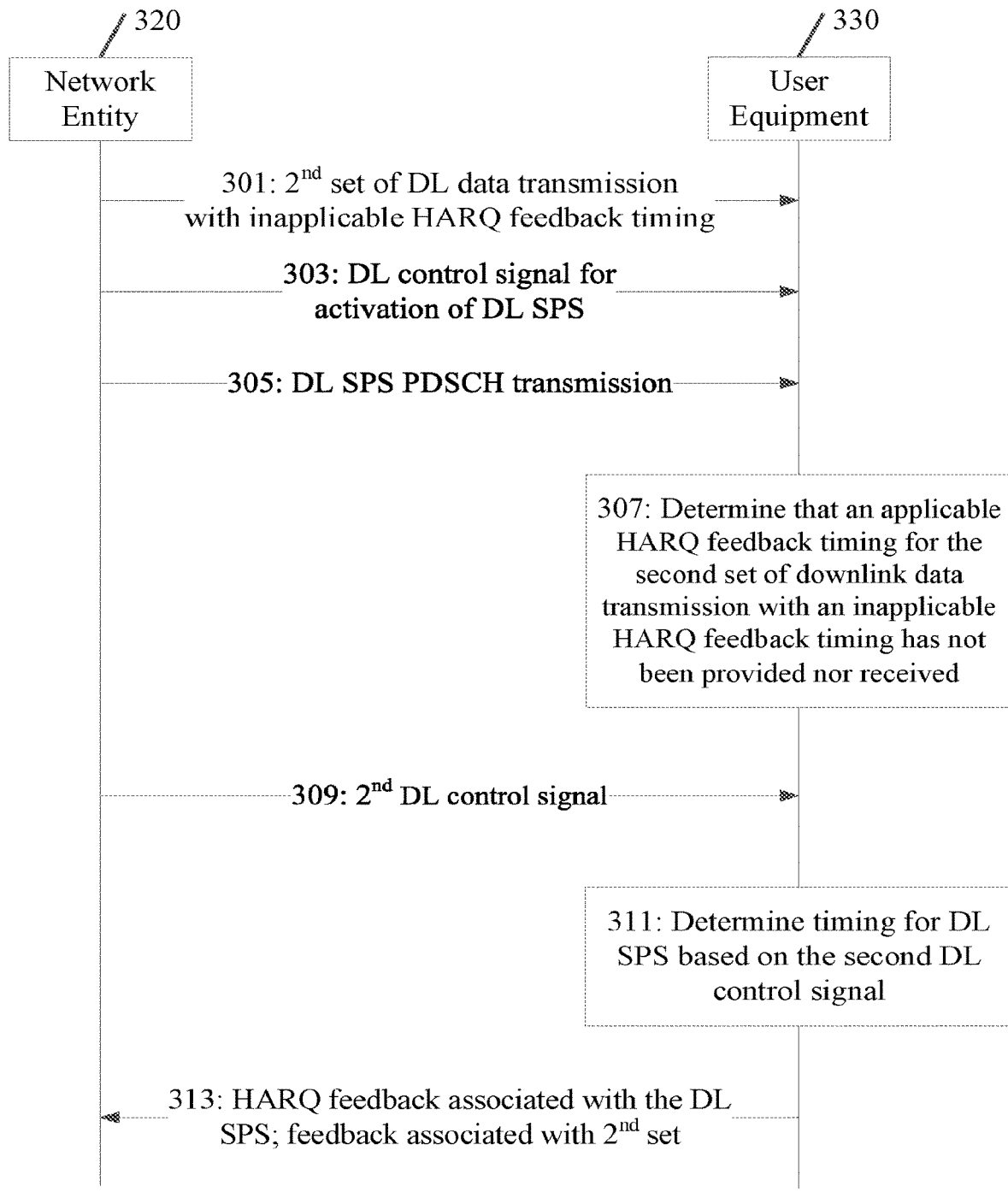
FIG. 3 illustrates an example of a signaling diagram according to various embodiments.
Figure 10:
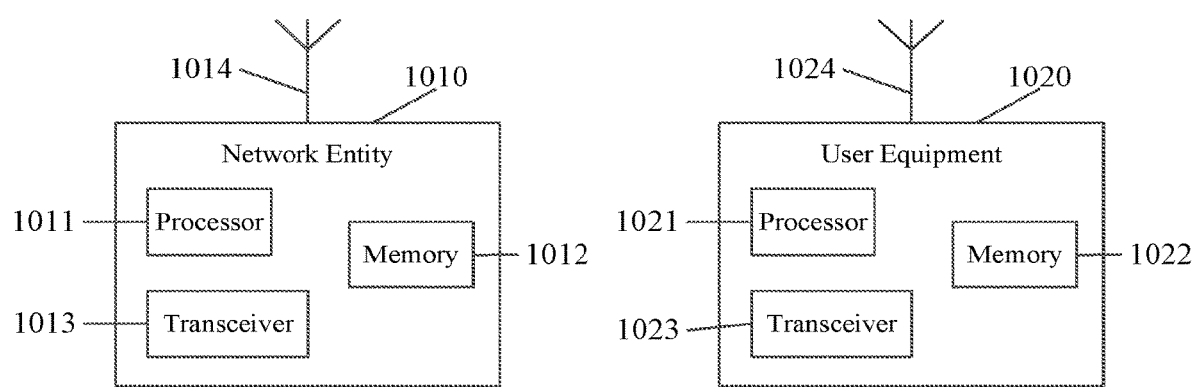
FIG. 10 illustrates an example of various network devices according to some embodiments.

FIG. 3 illustrates an example of a signaling diagram for reporting HARQ feedback for DL SPS after being triggered by a separate DCI, according to some example embodiments. Network entity (NE) 320 and user equipment (UE) 330 may be similar to NE 1010 and UE 1020, as illustrated in FIG. 10 discussed below, according to certain embodiments. UE 330 may be configured to operate in an unlicensed spectrum and/or may be configured to receive an indication (e.g., a parameter Inapplicable-DL-SPS-timing) configured to enable/activate HARQ feedback transmission for DL SPS data transmission based on an applicable HARQ feedback timing provided by a later second DL control signal in some embodiments.

At 301, UE 330 may receive a second set of DL data transmissions with at least one inapplicable HARQ feedback timing (e.g., a non-numerical K1) from NE 320. The second set of downlink data transmissions may include one or more of at least one dynamically scheduled DL data transmission and at least one SPS DL data transmission.

At 303, NE 320 may transmit to UE 330 a first downlink control signal (e.g., a first DCI) activating semi-persistent scheduling (SPS) of a first set of downlink data transmissions (e.g., DL SPS PDSCH transmission). In some embodiments, the downlink control signal may indicate an applicable hybrid automatic repeat request (HARQ) feedback timing for the first set of downlink data transmissions. In some embodiments, the first DL control signal received may include an applicable K1. Note that in some embodiments, additionally or alternatively, the first DL control signal may be received before 301.

At 305, NE 320 may transmit to UE 330 at least one DL SPS data transmission (e.g., in PDSCH) of at least one DL SPS configuration. In some embodiments, the DL SPS configurations may be activated at 303 using a DL control signal, e.g., the first DL DCI. In some embodiments, the at least one received DL SPS PDSCH may be activated and/or configured with at least one applicable timing indication, e.g., a numerical K1 value.

At 307, UE 330 may determine that an applicable HARQ feedback timing for the second set of downlink data transmission received at 301 with an inapplicable HARQ feedback timing has not been provided nor received. The second set of downlink data transmissions is received prior to the one or more of the first set of downlink data transmissions. In some embodiments, UE 330 may have previously received, at 301, a dynamically scheduled PDSCH and/or another DL SPS PDSCH activated or configured with at least one inapplicable timing indication, e.g., a non-numerical K1 value (discussed in detail below), such as NN-K1, and/or have not previously received at least one scheduled PDSCH with the at least one applicable K1 value.

At 309, NE 320 may transmit to UE 330 a second DL control signal (e.g., a second DCI). In some embodiments, the second DL control signal may include at least one applicable HARQ feedback timing indication (e.g., a numerical K1). In some embodiments, the second DL control signal may schedule a third DL data transmission (e.g., in PDSCH).

At 311, UE 330 may determine a timing for the DL SPS received at 305 based on the second DL control signal received at 309, e.g., based on the applicable timing, such as a K1, indicated in the second DL control signal. In some embodiments, UE 330 may perform operations 307 and 311 when HARQ feedback transmission for DL SPS data transmission based on an applicable HARQ feedback timing provided by the second DL control signal is enabled/activated with an indication, e.g., Inapplicable-DL-SPS-timing, configured to enable/activate HARQ feedback transmission for DL SPS data transmission based on an applicable HARQ feedback timing. Note that this parameter is just presented as an example, and this solution for determining HARQ feedback timing for DL SPS data transmission can be enabled with any suitable signaling. In some embodiments, the enabling signalling is not needed, and this solution is enabled by default.

At 313, UE 330 may transmit at least one HARQ feedback associated with the at least one received DL SPS PDSCH to NE 320. In various embodiments, the transmission at 313 may occur in response to UE 330 receiving a second DCI at 309 with at least one applicable K1 value triggering HARQ feedback for at least one PDSCH of at least one DL SPS configuration. In certain embodiments where UE 330 has received at least one DL SPS PDSCH activation with an applicable K1 value in 303, UE 330 may be configured to transmit, to NE 320, at least one HARQ feedback for the SPS PDSCH received at 305 after receiving the second DCI at 309 triggering UE 330 to transmit at least one HARQ feedback associated with the pending second set of DL data transmissions received at 301 (which may include a dynamically scheduled PDSCH or one or more DL SPS PDSCH). This may be on the condition that UE 330 has received at least one dynamically scheduled first PDSCH with NN-K1 (inapplicable value) indicated and/or a first DL SPS PDSCH occasion activated/configured with NN-K1 prior to receiving the SPS PDSCH with an applicable K1 value at 305, but has not yet received a DCI providing HARQ feedback timing for the first PDSCH or the first DL SPS PDSCH with NN-K1. This transmission may be performed according to a timing indicated by the triggering DCI (e.g., the second DCI received at 309). This may avoid an OOO HARQ process occurring.

In some embodiments, the second DL control signal received at 309 may schedule a further DL data transmission, e.g., a PDSCH transmission. In some embodiments, at 313, the UE 330 may transmit HARQ feedback for one or more of the first set of DL SPS data transmissions received at 305 together with HARQ feedback for the second set of downlink data transmissions received at 301 and HARQ feedback for a third downlink data transmission scheduled by the second downlink control signal received at 309. In some embodiments, the second downlink control signal received at 309 may indicate a number of downlink data transmissions of the first set of downlink data transmissions to be included in a HARQ feedback. This may enable a common understanding on the payload of HARQ feedback and reduce blind detection by NE 320.

Figure 5:
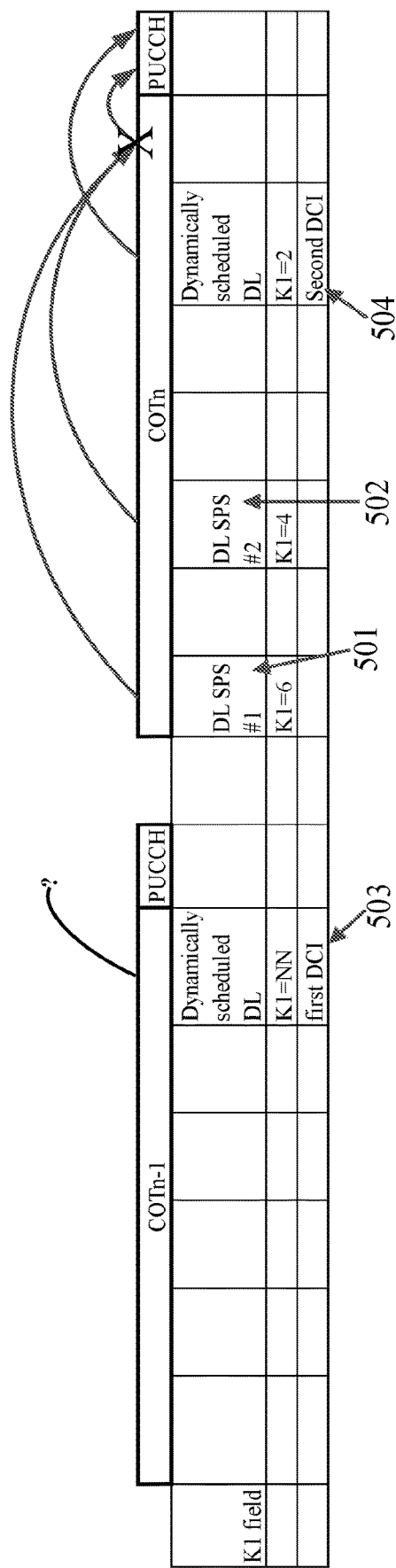
FIG. 5 illustrates an example of an alternative with additional conditions according to various embodiments.
Figure 6:
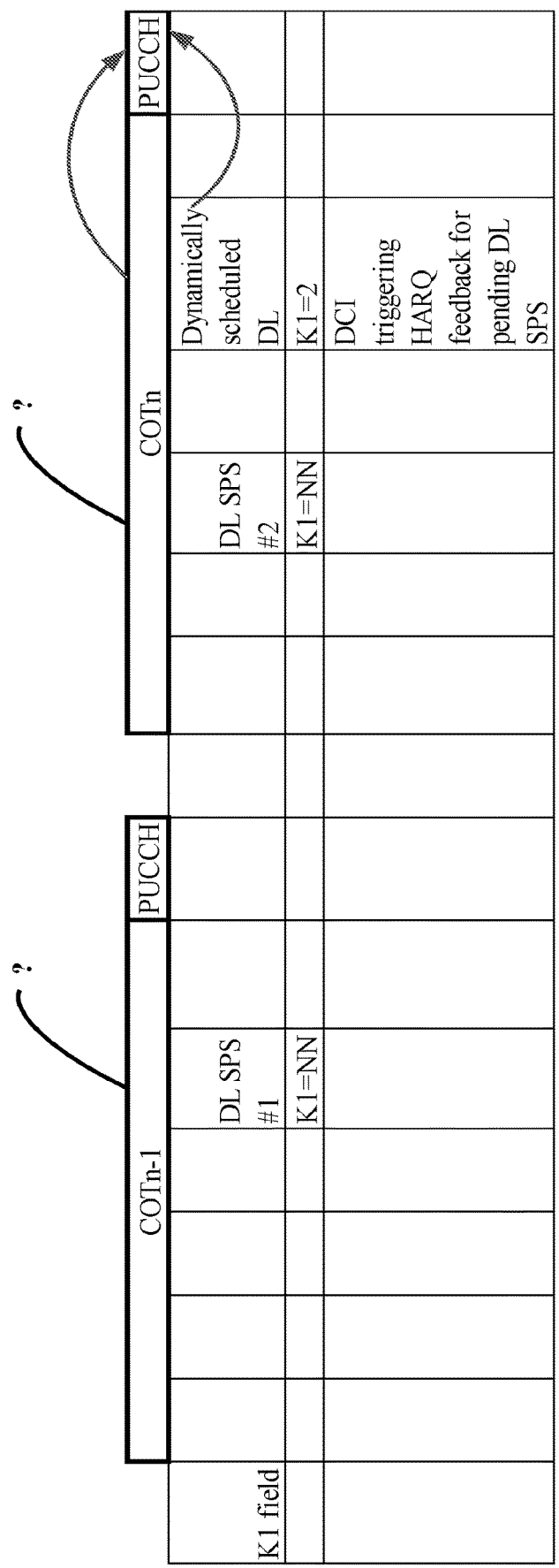
FIG. 6 illustrates another example of an alternative with additional conditions according to some embodiments.

FIG. 5 illustrates an example where a UE has previously received at least one DL SPS PDSCH activation with an applicable K1 value before receiving the DL SPS PDSCH 501 and 502, similar to 305 in FIG. 3. In this example, the UE also receives a DCI 503 with an NN-K1 value prior to the DL SPS PDSCH 501 and 502 and configured to dynamically schedule a PDSCH. Alternatively, in some examples, DCI 503 may activate/configure a SPS PDSCH with an NN-K1 value. In some embodiments, the NN-K1 in DCI 503 may also apply to the at least one DL SPS PDSCH 501 and 502, if the UE has at least one pending scheduled PDSCH with NN-K1 (e.g., the PDSCH scheduled by DCI 503), i.e., the UE has not transmitted HARQ feedback for the scheduled PDSCH with NN-K1, until a further DL control signal (e.g., DCI 504) with an applicable timing indication is received or provided. This may provide the advantage of avoiding an OOO HARQ.

In some embodiments, if UE 330 does not receive the DCI with the NN-K1 value for scheduling the second set of DL data transmission at 301, UE 330 may transmit at least one HARQ feedback for DL SPS PDSCH received at 305 based on DL SPS activation K1 received at 303 and/or at least one RRC configured PUCCH resource. This is because, in this case, UE 330 is unaware that the pending DL data transmission transmitted at 301 has not been provided a HARQ feedback. In this case, NE 320 may perform detection of transmission and detect that UE 330 missed the DCI with the NN-K1 value for scheduling the second set of DL data transmission at 301.

Figure 4:
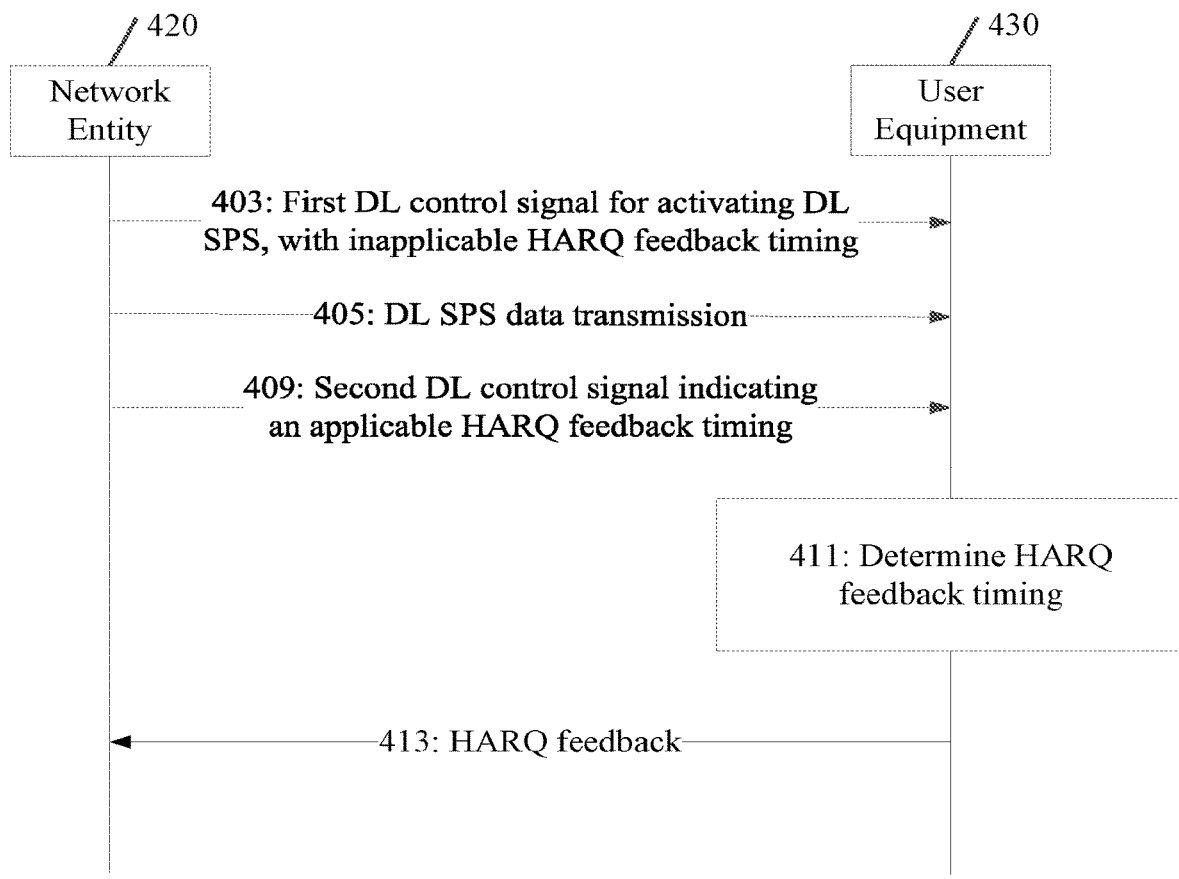
FIG. 4 illustrates another example of a signaling diagram according to certain embodiments.

FIG. 4 illustrates another example of a signaling diagram for reporting HARQ feedback for DL SPS according to some example embodiments. Network entity (NE) 420 and user equipment (UE) 430 may be similar to NE 1010 and UE 1020, as illustrated in FIG. 10 discussed below, according to certain embodiments. In some embodiments, NE 420 may transmit to UE 430 at least one DL SPS PDSCH activation with an inapplicable NN-K1 value at 403, UE 430 may transmit, to NE 420, at least one HARQ feedback for the corresponding SPS PDSCHs after receiving a DCI (dedicated for DL SPS HARQ feedback collection) triggering UE 420 to report the pending DL SPS PDSCH HARQ feedback, according to the timing indicated by the DCI. The DCI may trigger HARQ feedback for c latest PDSCH occasions of the DL SPS configuration. Note that in this embodiment, the operations 301 and 307 in FIG. 3 may not be performed. In the example illustrated in FIG. 4, the first DL control signal received at 403 for activating DL SPS data transmission (e.g., PDSCH) may indicate an inapplicable HARQ timing (e.g., a NN-K1). Operation 405 may be similar to 305 in FIG. 3. At 409, NE 420 may transmit to UE 430 at least one second DL control signal indicating an applicable HARQ feedback timing for one or more of DL SPS data transmission received at 405.

Note that in some embodiments, the second DL control signal received at 409 may be a DCI dedicated for triggering HARQ feedback without scheduling other DL data transmission. Similar to operations 311 and 313 in FIG. 3, at 411 and 413, UE 420 may determine HARQ timing for the DL SPS data transmission and transmit the HARQ feedback for at least one DL SPS data transmission based on the HARQ timing indicated in the second DL control signal received at 409.

FIG. 5 illustrates an example where a UE has previously received at least one DL SPS PDSCH activation with an inapplicable K1 value, such as NN-K1. Feedback timing for the DL SPS PDSCH may then be determined based on a timing indicated in a downlink control signal (e.g., a DCI) received later. The downlink control signal may trigger HARQ feedback for the DL SPS PDSCH, and may not schedule any further DL data transmission.

Figure 7:
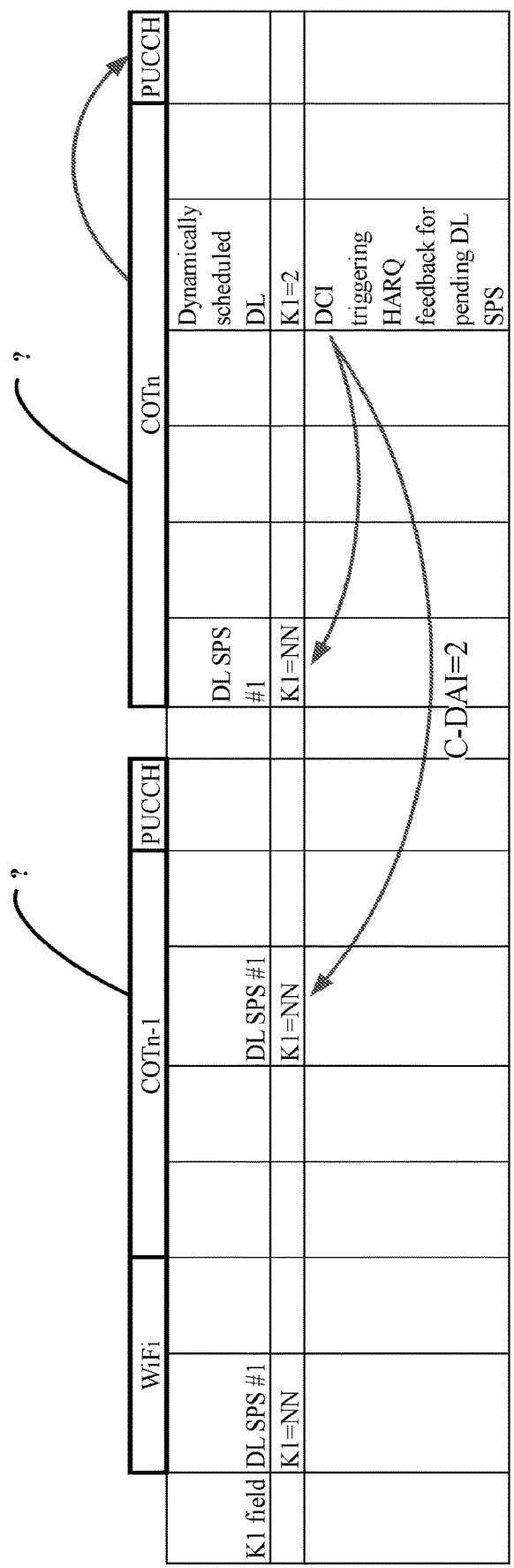
FIG. 7 illustrates an example of an impact of a downlink assignment index (DAI) counter according to various embodiments.

In various embodiments, the DCI triggering HARQ report may not be configured to schedule PDSCH and/or its cyclic redundancy check (CRC) may be scrambled with at least one configured scheduling radio network temporary identifier (CS-RNTI). UE 430 may interpret at least one trigger condition, such as a zero-resource allocation (RA) and/or a new data indicator (NDI) set to 1, as enabling differentiation of DCI from DL SPS release DCI. Upon validation of the DCI triggering HARQ report, UE 430 may interpret a 2-bit counter downlink assignment indicator (C-DAI) c as triggering feedback for at least one latest c DL SPS PDSCH, where c is an integer. Furthermore, if UE 430 received another DCI triggering TYPE-2/e-TYPE-2 CB in the same slot, UE 430 may be configured to concatenate the DL SPS PDSCH CB to a regular CB. As a result, UE 430 may separately consider the C-DAI of triggering DCI from the DAI process of dynamically scheduled PDSCHs, as shown in FIG. 7. In this example, C-DAI may indicate 2, for example, when LBT failed, such as due to WiFi interference, and/or blocked the first DL SPS PDSCH occasion. In some variants, DCI may indicate C-DAI for scheduled PDSCH, and another unused field in the DCI may be used for triggering feedback for at least one latest c DL SPS PDSCH, wherein the field may be, for example, redundancy version (RV) and hybrid automatic request identification (HARQ-ID).

In certain embodiments, if UE 430 validates DCI triggering TYPE-3 CB without scheduling PDSCH and scrambled with C- or CS-RNTI, UE 430 may report HARQ feedback for HARQ processes not yet reported, along with at least one additional restriction imposed by above discussed C-DAI c, as described above.

Figure 8:
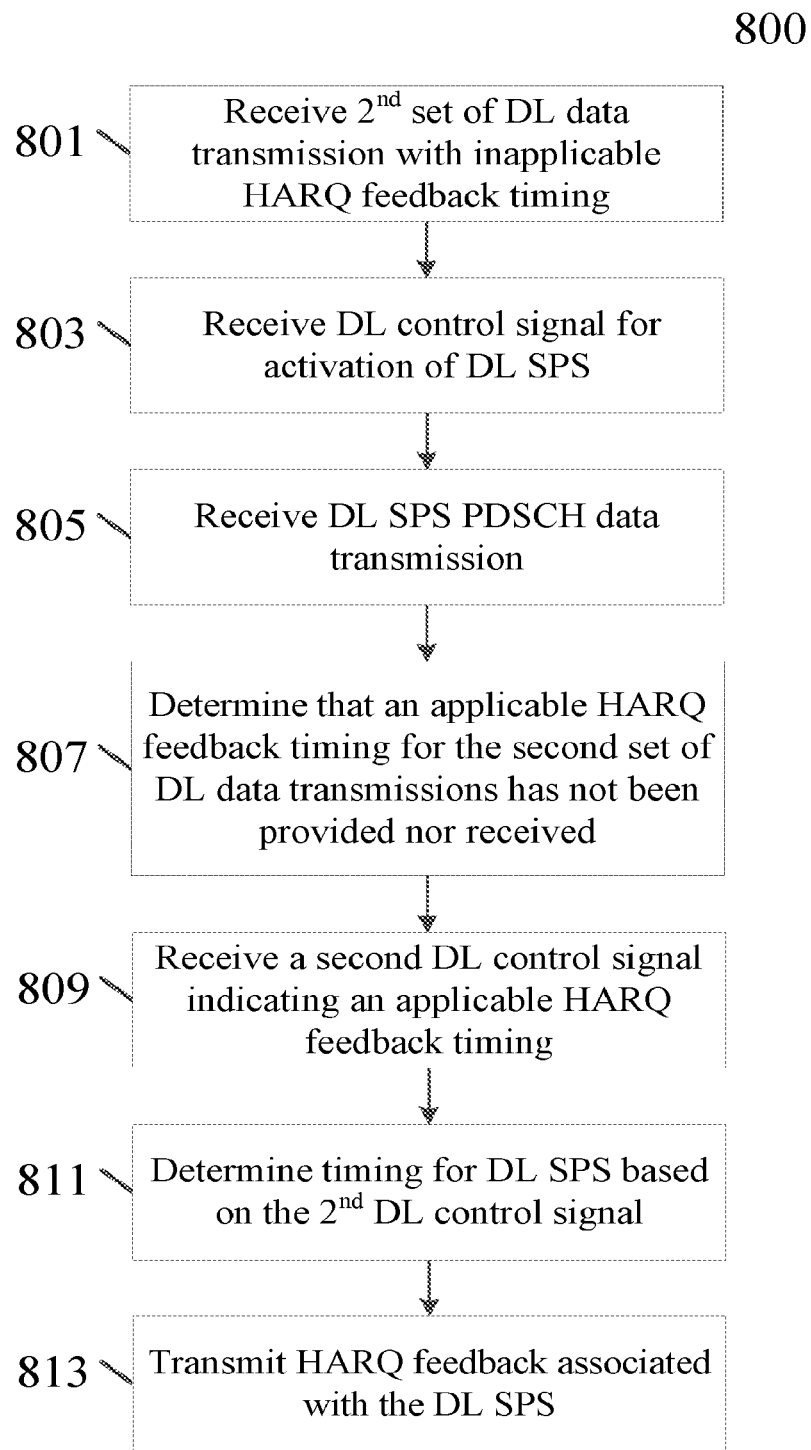
FIG. 8 illustrates an example of a flow diagram of a method according to various embodiments.

FIG. 8 illustrates an example of a flow diagram of a method 800 that may be performed by a UE, such as UE 1020 illustrated in FIG. 10, according to various embodiments.

At 801, the UE may receive from a NE, such as NE 1010 in FIG. 10, a second set of DL data transmissions with at least one inapplicable HARQ feedback timing. In some embodiments, the UE may receive, at 801, a dynamically scheduled PDSCH and/or another DL SPS PDSCH activated or configured with at least one inapplicable timing indication, e.g., a non-numerical K1 value, such as NN-K1.

At 803, the UE may receive from the NE a first DL control signal (e.g., a DCI) configured for activation of DL SPS of a first set of DL data transmission. In some embodiments, the first DL control signal received may include an applicable HARQ timing (e.g., a numerical K1). In various embodiments, the first DL control signal may be received before 801.

At 805, the UE may receive from the NE at least one DL SPS data transmission (e.g., in PDSCH) of at least one DL SPS configuration. In some embodiments, DL SPS configurations may be activated at 803 using the DL control signal, e.g., a first DL DCI. In some embodiments, the at least one received DL SPS PDSCH may be activated and/or configured with at least one applicable timing indication, e.g., a numerical K1 value.

At 807, the UE may determine that an applicable HARQ feedback timing for the second set of DL data transmission has not been provided nor received. The second set of DL data transmissions may be received prior to one or more of the first set of downlink SPS data transmissions. The UE may determine that it has not previously received a DL control signal providing an applicable K1 value for the second set of DL data transmissions.

At 809, the UE may receive from the NE a second DL control signal (e.g., a second DCI). The second DL control signal may include at least one applicable HARQ feedback timing indication (e.g., a numerical K1 value). In some embodiments, the second DL control signal may schedule a third DL data transmission (e.g., in PDSCH).

At 811, the UE may determine a timing for the DL SPS based on the second DL control signal indicating an applicable HARQ feedback timing received at 809. At 813, the UE may transmit at least one HARQ feedback associated with at least one DL SPS PDSCH received at 805 to the NE. In various embodiments, the transmission at 813 may occur in response to the UE receiving the second DCI with at least one applicable K1 value triggering HARQ feedback for the at least one PDSCH of at least one DL SPS configuration. In certain embodiments where the UE has received at least one DL SPS PDSCH activation with an applicable K1 value at 805, the UE may be configured to transmit, to the NE, at least one HARQ feedback for the DL SPS PDSCH after receiving the DCI at 809 triggering the UE to transmit at least one HARQ feedback associated with a pending PDSCH or DL SPS PDSCH received at 801. This may be on the condition that the UE has received a dynamically scheduled first PDSCH with NN-K1 (inapplicable value) indicated and/or a first DL SPS PDSCH occasion activated/configured with NN-K1 prior to receiving the SPS PDSCH at 805 with an applicable K1 value, and has not yet received a DCI providing HARQ feedback timing for the first PDSCH or the first DL SPS PDSCH with NN-K1. This transmission may be performed according to a timing indicated by the triggering DCI received at 809.

In some embodiments, at 813, the UE may transmit HARQ feedback for one or more of the first set of downlink SPS data transmissions received at 805 together with HARQ feedback for the second set of downlink data transmissions and HARQ feedback for the third downlink data transmission scheduled by the second downlink control signal.

In some embodiments, the UE may be configured to operate in an unlicensed spectrum and/or may be configured to receive an enabling signaling (e.g., a parameter Inapplicable-DL-SPS-timing) as described with reference to FIG. 3 to enable the UE to determine the HARQ feedback timing for the first set of DL data transmission based on a second DL control signal which is received later.

Figure 9:
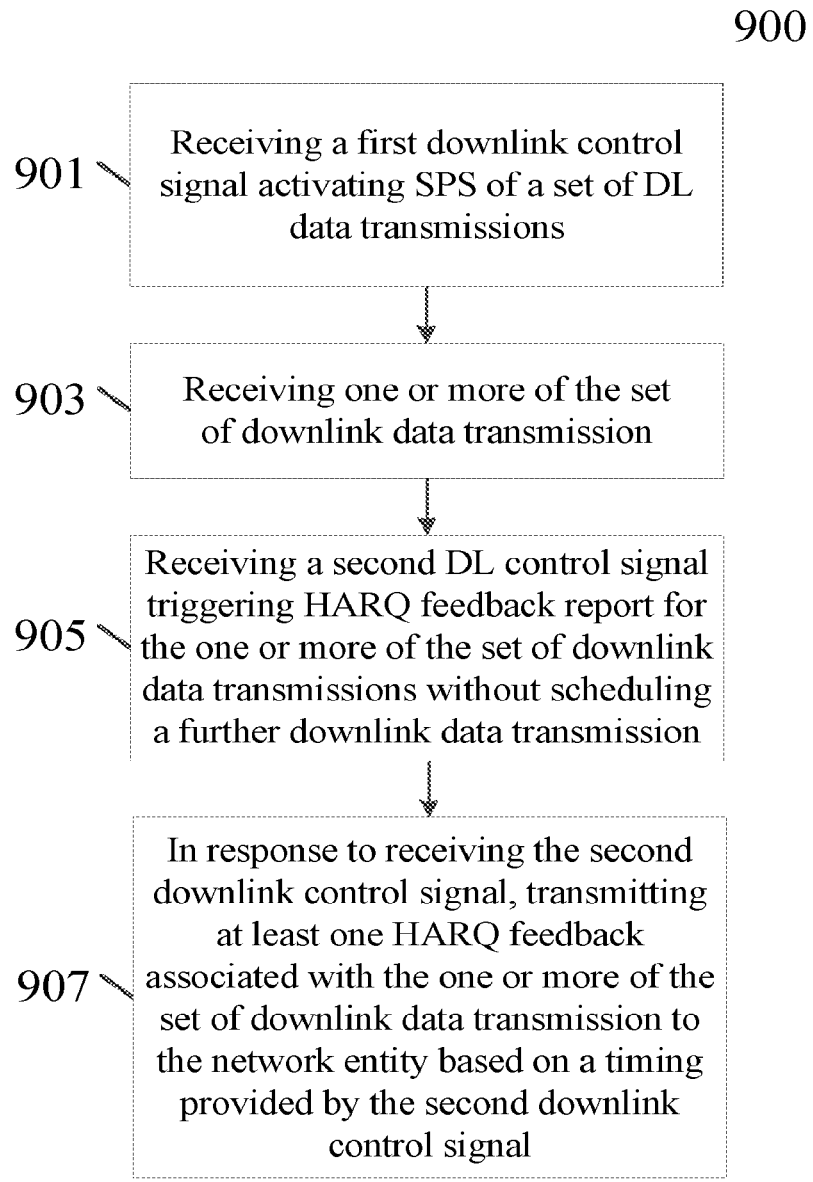
FIG. 9 illustrates another example of a flow diagram of a method according to some embodiments.

FIG. 9 illustrates an example of a flow diagram of another method 900 that may be performed by a UE, such as UE 1020 illustrated in FIG. 10, according to various embodiments. At 901, the UE may receive from a network entity, such as NE 1010 illustrated in FIG. 10, a first downlink (DL) control signal activating semi-persistent scheduling (SPS) of a first set of downlink data transmissions. The first downlink control signal indicates an inapplicable hybrid automatic repeat request (HARQ) feedback timing (e.g., a NN-K1) for the first set of downlink data transmissions.

At 903, the UE may receive one or more of the first set of downlink data transmissions. At 905, the UE may receive a second DL control signal triggering HARQ feedback for one or more of the DL data transmission received at 903. The second DL control signal may indicate an applicable HARQ feedback timing, but may not schedule a further DL data transmission.

At 907, in response to receiving the second DL control signal at 905, the UE may determine a HARQ feedback timing for the one or more of the first set of downlink data transmissions received based on the second downlink control signal received. In various embodiments, the second downlink control signal may indicate a number of downlink data transmissions of the set of downlink data transmissions to be included in a HARQ feedback.

In some embodiments, the UE may be configured to operate in an unlicensed spectrum and/or is configured to receive an enabling signaling (e.g., a parameter Inapplicable-DL-SPS-timing) to enable the UE to determine the HARQ feedback timing for one or more of the first set of DL SPS data transmission based on a later DL control signal as described above.

FIG. 10 illustrates an example of a system according to certain example embodiments. In one example embodiment, a system may include multiple devices, such as, for example, NE 1010 and/or UE 1020.

NE 1010 may be one or more of a base station, such as an eNB or gNB, a server, and/or any other access node or combination thereof. Furthermore, NE 1010 and/or UE 1020 may be one or more of a citizens broadband radio service device (CBSD).

NE 1010 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 1020 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. In some embodiments, UE 1020 may include a wearable terminal device, portable computers, music storage and playback appliances, vehicle-mounted wireless terminal devices, wireless endpoints, mobile stations, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

NE 1010 and/or UE 1020 may include at least one processor, respectively indicated as 1011 and 1021. Processors 1011 and 1021 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1012 and 1022. The memory may be fixed or removable. The memory may include computer program instructions or computer code contained therein. Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1011 and 1021, memories 1012 and 1022, and any subset thereof, may be configured to provide means corresponding to the various blocks of FIGS. 3-9. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 10, transceivers 1013 and 1023 may be provided, and one or more devices may also include at least one antenna, respectively illustrated as 1014 and 1024. The device may have many antennas, such as an array of antennas configured for multiple input multiple output (MIMO) communications, or multiple antennas for multiple RATs. Other configurations of these devices, for example, may be provided. Transceivers 1013 and 1023 may be a transmitter, a receiver, both a transmitter and a receiver, or a unit or device that may be configured both for transmission and reception.

The memory and the computer program instructions may be configured, with the processor for the particular device, to cause an apparatus, such as UE, to perform any of the processes described above (i.e., FIGS. 3-9). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 3-9. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

In some embodiments, an apparatus may comprise means for performing (or causing performance of) operations described with reference to any of FIGS. 3-9. In some embodiments, the means may comprise at least one processor; and at least one memory including computer program code. The at least one memory and computer program code may be configured to, with the at least one processor, cause the performance of the apparatus.

Figure 11:
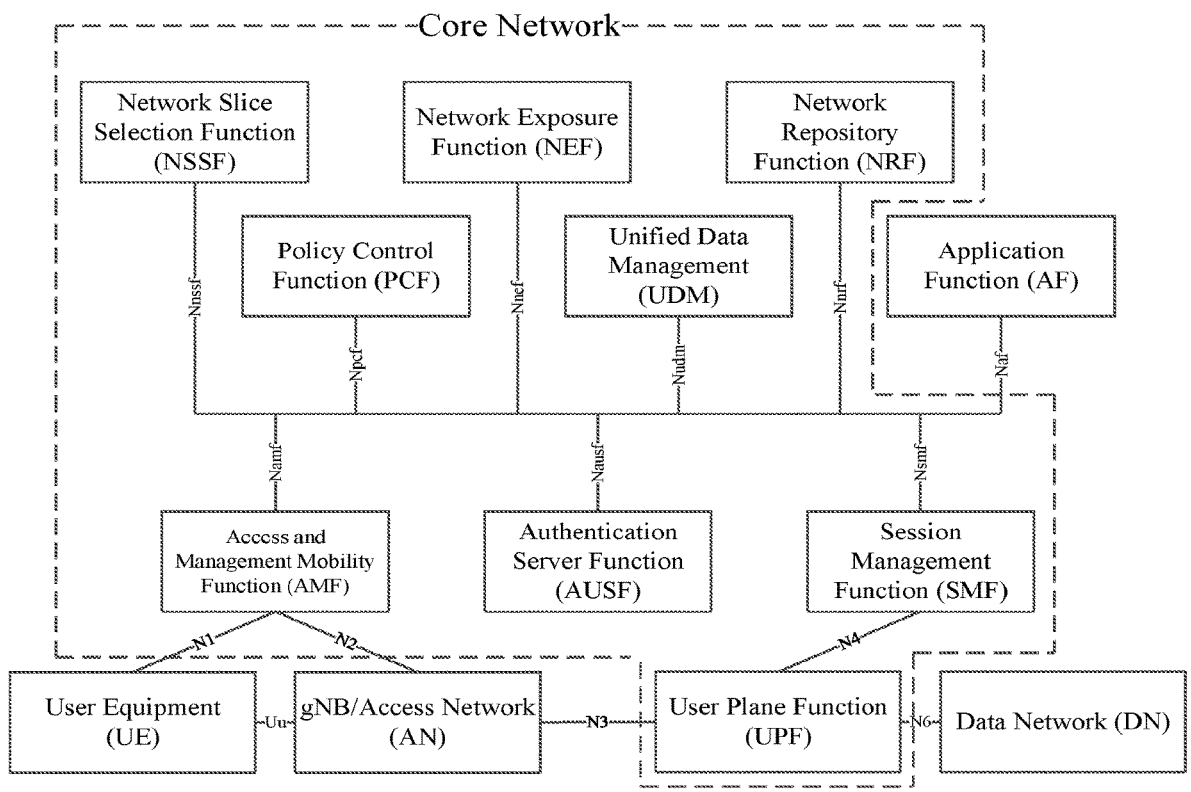
FIG. 11 illustrates an example of a wireless network and system architecture according to certain embodiments.

FIG. 11 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 11 may be similar to NE 1010 and UE 1020, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

Figure 12:
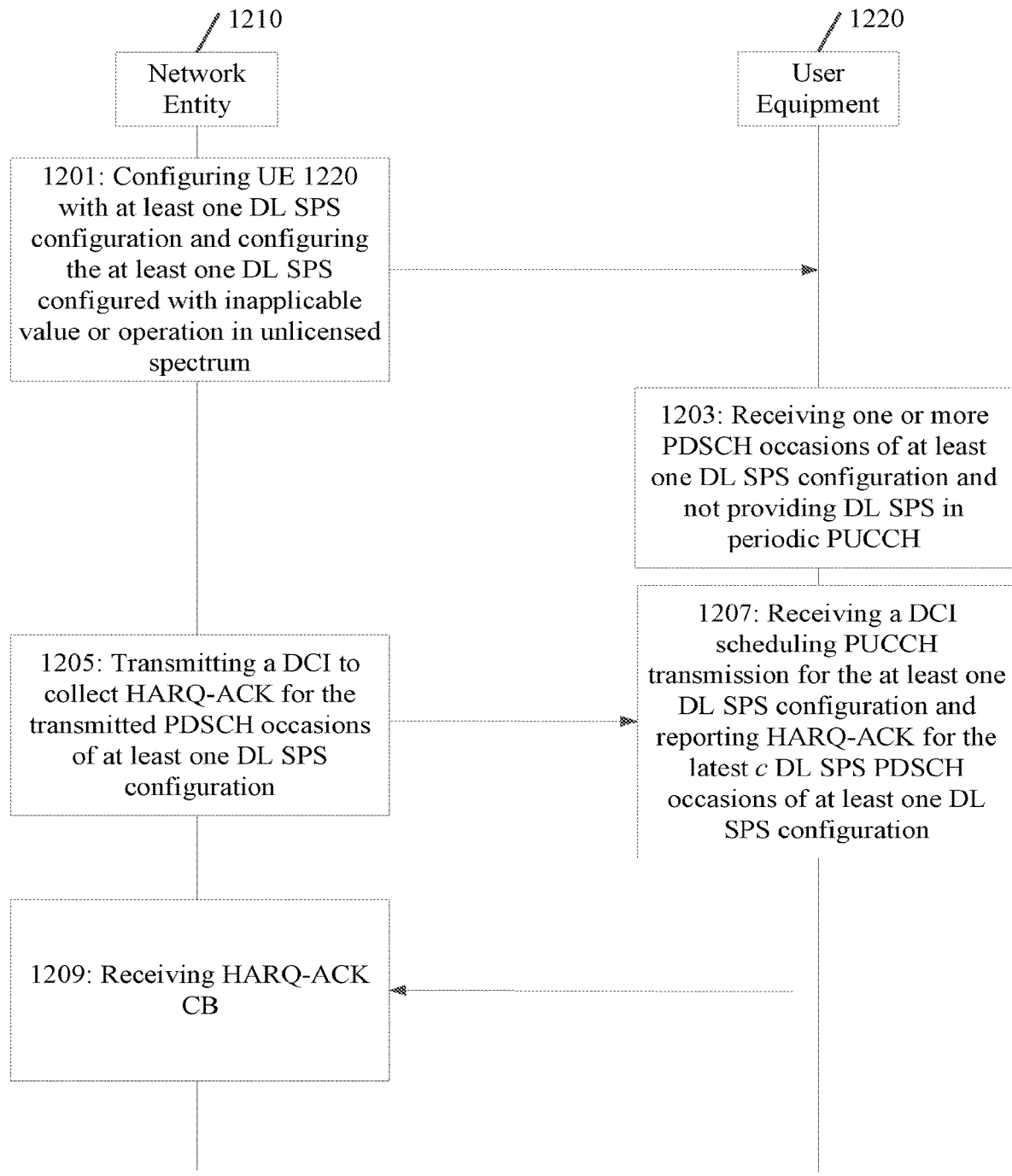
FIG. 12 illustrates an example of a signaling diagram according to some embodiments.

FIG. 12 illustrates another example of a signaling diagram for reporting HARQ feedback according to some example embodiments. Network entity (NE) 1210 and user equipment (UE) 1220 may be similar to NE 1010 and UE 1020, as illustrated in FIG. 10 discussed below, according to certain embodiments. At 1201, NE 1210 may configure UE 1220 with at least one DL SPS configuration, wherein the at least one DL SPS is configured with at least one inapplicable value and/or operation in unlicensed spectrum.

At 1203, UE 1220 may receive one or more PDSCH occasions of at least one DL SPS configuration and not provide DL SPS in periodic PUCCH. At 1205, NE 1210 may transmit at least one DCI to UE 1220. The DCI is configured to collect HARQ-ACK for the transmitted PDSCH occasions of at least one DL SPS configuration. At 1207, UE 1220 may receive at least one further DCI scheduling PUCCH transmission for the at least one DL SPS configuration, and report HARQ-ACK for the latest c DL SPS PDSCH occasions of at least one DL SPS configuration. In some embodiments, the value of c may be indicated in the further DCI. At 1209, NE 1210 may receive at least one HARQ-ACK codebook from UE 1220.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP Third Generation Partnership Project
5G Fifth Generation
5GC Fifth Generation Core
5GS Fifth Generation System
ACK Acknowledgement
AMF Access and Mobility Management Function
ARQ Automatic Repeat Request
ASIC Application Specific Integrated Circuit
BS Base Station
CB Codebook
CBSD Citizens Broadband Radio Service Device
C-DAI Counter Downlink Assignment Indicator
CN Core Network
COT Channel Occupancy Time
CPU Central Processing Unit
CRC Cyclic Redundancy Check
CS-RNTI Configured Scheduling Radio Network Temporary Identifier
DAI Downlink Assignment Index
DCI Downlink Control Information
DL Downlink
eMBB Enhanced Mobile Broadband
eMTC Enhanced Machine Type Communication
eNB Evolved Node B
eOLLA Enhanced Outer Loop Link Adaptation
EPS Evolved Packet System
FR Frequency Range
gNB Next Generation Node B
GPS Global Positioning System
HARQ Hybrid Automatic Repeat Request
HDD Hard Disk Drive
IEEE Institute of Electrical and Electronics Engineers
LBT Listen Before Talk
LTE Long-Term Evolution
LTE-A Long-Term Evolution Advanced
MAC Medium Access Control
MBS Multicast and Broadcast Systems
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MTC Machine Type Communication
NACK Negative Acknowledgement
NAS Non-Access Stratum
NDI New Data Indicator
NE Network Entity
NG Next Generation
NG-eNB Next Generation Evolved Node B
NG-RAN Next Generation Radio Access Network
NN Non-Numerical
NR New Radio
NR-U New Radio Unlicensed
OOO Out-of-Order PDA Personal Digital Assistance
PDCCH Physical Downlink Control Channel
PDSCH Physical Downlink Shared Channel
PDU Protocol Data Unit
PRACH Physical Random Access Channel
PRB Physical Resource Block
P-RNTI Paging Radio Network Temporary Identifier
PUCCH Physical Uplink Control Channel
PUSCH Physical Uplink Shared Channel
QoS Quality of Service
RAM Random Access Memory
RAN Radio Access Network
RAT Radio Access Technology
RLC Radio Link Control
RNTI Radio Network Temporary Identifier
RRC Radio Resource Control
RS Reference Signal
RV Redundancy Version
SCS Subcarrier Spacing
SLIV Start and Length Indicator
SMF Session Management Function
SPS Semi-Persistent Scheduling
SR Scheduling Report
TB Transport Block
TR Technical Report
TS Technical Specification
Tx Transmission
UCI Uplink Control Information
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. A method, comprising:
receiving, by a user equipment from a network entity, a first downlink (DL) control signal activating semi-persistent scheduling (SPS) of a first set of downlink data transmissions, the first downlink control signal indicating an applicable hybrid automatic repeat request (HARQ) feedback timing for the first set of downlink data transmissions;
receiving one or more of the first set of downlink data transmissions;
determining that an applicable HARQ feedback timing for a received second set of downlink data transmission has not been provided, the second set of downlink data transmission being scheduled by a further downlink control signal indicating an inapplicable HARQ feedback timing for the second set of downlink data transmissions, the second set of downlink data transmissions being received prior to the one or more of the first set of downlink data transmissions;
in response to the determination, determining a HARQ feedback timing for the one or more of the first set of downlink data transmissions based on a second downlink control signal indicating an applicable HARQ feedback timing received after reception of the one or more of the first set of downlink data transmissions; and
transmitting, by the user equipment, at least one HARQ feedback associated with the one or more of the first set of downlink data transmissions for a predetermined threshold number of downlink data transmissions together with HARQ feedback for the second set of downlink data transmissions and HARQ feedback for a third downlink data transmission scheduled by the second downlink control signal.

2. The method of claim 1, wherein the second set of downlink data transmissions comprises one or more of: at least one dynamically scheduled DL data transmission or at least one SPS DL data transmission.

3. The method of claim 2, wherein the second downlink control signal indicates a number of downlink data transmissions of the first set of downlink data transmissions to be included in a HARQ feedback.

4. The method of claim 1, wherein the second set of downlink data transmissions comprises one or more of: at least one dynamically scheduled DL data transmission or at least one SPS DL data transmission.

5. The method of claim 4, wherein the second downlink control signal indicates a number of downlink data transmissions of the first set of downlink data transmissions to be included in a HARQ feedback.

6. The method of claim 1, wherein the second downlink control signal indicates a number of downlink data transmissions of the first set of downlink data transmissions to be included in a HARQ feedback.

7. An apparatus, comprising at least one processor and at least one memory including computer program code, wherein the at least one memory and the computer program code are configured to, with the at least one processor, cause the apparatus at least to:
receive, from a network entity, a first downlink (DL) control signal activating semi-persistent scheduling (SPS) of a first set of downlink data transmissions, the first downlink control signal indicating an applicable hybrid automatic repeat request (HARQ) feedback timing for the first set of downlink data transmissions;
receive one or more of the first set of downlink data transmissions;
determine that an applicable HARQ feedback timing for a received second set of downlink data transmission has not been provided, the second set of downlink data transmission being scheduled by a further downlink control signal indicating an inapplicable HARQ feedback timing for the second set of downlink data transmissions, the second set of downlink data transmissions being received prior to the one or more of the first set of downlink data transmissions;
in response to the determination, determine a HARQ feedback timing for the one or more of the first set of downlink data transmissions based on a second downlink control signal indicative of an applicable HARQ feedback timing received after reception of the one or more of the first set of downlink data transmissions; and
transmit at least one HARQ feedback associated with the one or more of the first set of downlink data transmissions for a predetermined threshold number of downlink data transmissions together with HARQ feedback for the second set of downlink data transmissions and HARQ feedback for a third downlink data transmission scheduled by the second downlink control signal.

8. The apparatus of claim 7, wherein the second set of downlink data transmissions comprises one or more of: at least one dynamically scheduled DL data transmission or at least one SPS DL data transmission.

9. The apparatus of claim 8, wherein the second downlink control signal indicates a number of downlink data transmissions of the first set of downlink data transmissions to be included in a HARQ feedback.

10. The apparatus of claim 7, wherein the second set of downlink data transmissions comprises one or more of: at least one dynamically scheduled DL data transmission or at least one SPS DL data transmission.

11. The apparatus of claim 10, wherein the second downlink control signal indicates a number of downlink data transmissions of the first set of downlink data transmissions to be included in a HARQ feedback.

12. The apparatus of claim 7, wherein the second downlink control signal indicates a number of downlink data transmissions of the first set of downlink data transmissions to be included in a HARQ feedback.

13. A non-transitory, computer-readable medium comprising program instructions stored thereon for causing an apparatus to:

receive, from a network entity, a first downlink (DL) control signal activating semi-persistent scheduling (SPS) of a first set of downlink data transmissions, the first downlink control signal indicating an applicable hybrid automatic repeat request (HARQ) feedback timing for the first set of downlink data transmissions;

receive one or more of the first set of downlink data transmissions;

determine that an applicable HARQ feedback timing for a received second set of downlink data transmission has not been provided, the second set of downlink data transmission being scheduled by a further downlink control signal indicating an inapplicable HARQ feedback timing for the second set of downlink data transmissions, the second set of downlink data transmissions being received prior to the one or more of the first set of downlink data transmissions;

in response to the determination, determine a HARQ feedback timing for the one or more of the first set of downlink data transmissions based on a second downlink control signal indicating an applicable HARQ feedback timing received after reception of the one or more of the first set of downlink data transmissions; and transmit at least one HARQ feedback associated with the one or more of the first set of downlink data transmissions for a predetermined threshold number of downlink data transmissions together with HARQ feedback for the second set of downlink data transmissions and HARQ feedback for a third downlink data transmission scheduled by the second downlink control signal.

14. The non-transitory, computer-readable medium of claim 13, wherein the second set of downlink data transmissions comprises one or more of: at least one dynamically scheduled DL data transmission or at least one SPS DL data transmission.

15. The non-transitory, computer-readable medium of claim 13, wherein the second downlink control signal indicates a number of downlink data transmissions of the first set of downlink data transmissions to be included in a HARQ feedback.

* * * * *